United States Patent [19]
Bekki

[11] Patent Number: 5,406,976
[45] Date of Patent: Apr. 18, 1995

[54] GASKET

[75] Inventor: Takashi Bekki, Fuji, Japan

[73] Assignee: Jatco Corporation, Fuji, Japan

[21] Appl. No.: 186,140

[22] Filed: Jan. 25, 1994

[30] Foreign Application Priority Data

Jan. 27, 1993 [JP] Japan .............................. 5-001740 U

[51] Int. Cl.⁶ ............................................ F16K 15/14
[52] U.S. Cl. .................................. 137/513.3; 137/855
[58] Field of Search ................................. 137/855–858, 137/513.3

[56] References Cited

U.S. PATENT DOCUMENTS

| 623,617 | 4/1899 | O'Crowley | 137/858 X |
| 2,926,693 | 3/1960 | Ziegler | 137/857 X |
| 3,421,545 | 1/1969 | DeMarco | 137/513.3 |
| 4,487,662 | 12/1984 | Fischbeck | 137/855 X |

FOREIGN PATENT DOCUMENTS 76171 8/1961 France ............................... 137/513.3

Primary Examiner—Robert G. Nilson
Attorney, Agent, or Firm—Foley & Lardner

[57] ABSTRACT

A gasket which is interposed between a pair of valve bodies of an automatic transmission each of which is provided with a hydraulic circuit for feeding operating fluid to frictional engaging elements of the automatic transmission. The gasket which is interposed between the pair of valve bodies is formed with a slit which in turn communicates with a fluid passage which in turn intercommunicate the hydraulic circuits of the pair of valve bodies, and has a valving element defined in the gasket by the slit. A portion on the side of the hydraulic circuit of one valve body is provided with a valve seat over which overlies and closes the slit. Depending upon the difference in pressure between the hydraulic circuits of the pair of valve bodies, the valving element elastically deforms itself so as to permit the flow of the operating fluid from one hydraulic circuit into the other hydraulic circuit. The numbers of component parts, the assembly steps and the quality control steps can be minimized so that the fabrication cost can be decreased, fabrication errors can be eliminated and highly stable and reliable sealability can be ensured.

4 Claims, 3 Drawing Sheets

GASKET

BACKGROUND OF THE INVENTION

1. Field of the Invention

The present invention relates to a gasket which is interposed together with a separate plate between valve bodies when a plurality of valve bodies are intercommunicated, each valve body having a hydraulic circuit which change the supply and discharge of operating fluid (generally, hydraulic oil) to and from frictional engaging elements of an automatic transmission.

2. Description of the Prior Art

So far as a gasket which is used in order to intercommunicate among a plurality of valve bodies which are components of hydraulic control unit for an automatic transmission, those of the type described in, for instance, "NISSAN FULL-RANGE DENSI SEIGYO AUTOMATIC TRANSMISSION SEIBIYOURYOUSHO (Nissan full-range electronic control automatic transmission maintenance and repair manual) RE4RO3A type, published by Nissan Motor Company Limited, March 1988, II-pp.58–63" have been well known by those skilled in the art.

More specifically, II-63 page of the above mentioned manual discloses a gasket to which is attached a separate one-way valve. More particularly, in order to change the supply and discharge hydraulic oil to and from the frictional engaging elements of the automatic transmission, upper and lower valve bodies are each provided with a hydraulic circuit. A separate plate which is sandwiched between upper and lower separate gaskets is interposed between the upper and lower valve bodies and each of the upper and lower gaskets and the separate plate is formed with an oil passage which in turn intercommunions between the hydraulic circuits of the upper and lower valve bodies. In addition, the separate plate on the side of the upper separate gasket is set up one-way valve which closes or opens the oil passage, and the one-way valve is pushed against the oil passage by the force of a spring. Furthermore, the one-way valve is formed with an orifice.

When hydraulic oil is supplied from the hydraulic circuit of the upper valve body to that of the lower valve body, hydraulic oil is gradually supplied through the orifice of the one-way valve to the lower valve body. On the other hand, when hydraulic oil in the hydraulic circuit of the upper valve body is discharged, the one-way valve is opened so that the oil pressure in the hydraulic circuit of the lower valve body rapidly falls.

However, since the one-way valve which is fabricated separately from the gasket is attached to the latter, there arise following problems that the number of component parts is increased, resulting in an increase in cost; the step for attaching the one-way valve to the gasket is required, resulting in an increase in production step; there is a fear that due to the difference between specifications, the one-way valve cannot be correctly attached to the gasket, resulting in an increase in product ion control step; and since the one-way valve and the gasket are fabricated separately, the position of the attached one-way valve is deviated from its correct position due to attachment errors and aging, resulting in variations in sealability and hence performance.

SUMMARY OF THE INVENTION

The present invention is therefore made to overcome the above described problems encountered in the prior art and has for its object to provide a gasket which can decrease the number of required component parts, the number of fabrication steps and the number of quality control steps, whereby the cost can be decreased and sealability and stability of performance can be ensured.

According to the present invention, a gasket and a one-way valve are integrated into a unitary construction, thereby attaining the above-mentioned objects.

A first embodiment of a gasket in accordance with the present invention which is interposed between a pair of valve bodies each of which is provided with a hydraulic circuit for feeding operating fluid to frictional engaging elements of an automatic transmission and which are mated and joined with each other is characterized in that the gasket interposed between the pair of valve bodies is provided with a slit which can intercommunicate between the hydraulic circuits of the pair of valve bodies and a valving element which is defined by the slit and is elastically deformable; a valve seat is overlaid on and closes the slit of the gasket on the side of the hydraulic circuit of one of the pair of valve bodies; and the valving element is elastically deformable in such a way that depending upon the difference in pressure in the hydraulic circuits of the pair of valve bodies, the operating fluid is only permitted to flow from one of the hydraulic circuits to the other.

In general, the operating fluid is an hydraulic oil. The valving element can be formed with an orifice which intercommunicate between the hydraulic circuits of the pair of valve bodies. In addition, the valving element can be provided with a reinforced member which is integrally bonded over the valving element. In this case, it is preferable that the reinforced member can adjust spring characteristics and/or strength of the valving element.

The valve seat is a separate plate which lie, together with the gasket, between the pair of valve bodies. The separate plate interposed between the pair of valve bodies can have an opening which is covered with the valving element. In this case, it is preferable that a U-shaped slit can be formed over part of the gasket which covers the opening, thereby defining the valving element.

According to the present invention, in the case of assembling the pair of valve bodies into a unitary construction, the gasket is interposed between the pair of valve bodies and is correctly positioned with respect to the pair of valve bodies. When the pair of valve bodies are securely joined each other, the valving element and the valve seat which are defined at one portion of the gasket and which defines a one-way valve are located at predetermined positions, respectively, at which the valving element and the valve seat interrupt the intercommunication between the hydraulic circuits of the pair of valve bodies.

In short, only by locating the gasket at a predetermined position with respect to the pair of valve bodies, the one-way valve can be correctly located at a predetermined position with respect to the pair of valve bodies. As described above, according to the present invention, the valve seat is formed to close the slit on one side of the hydraulic circuit of the gasket and the valve element is forced to contact with the valve seat or to be out of contact therewith. More particularly, when the pressure in one of the hydraulic circuits is higher than that in the other, the valving element is forced to contact with the valve seat so that the slit is covered with the valving element and the valve seat, whereby the inter communication between the hydraulic circuits is interrupted. On the other hand, when the pressure in the one hydraulic circuit is lower than that in the other hydraulic circuit, the valving element is forced to move away from the valve seat and is elastically deformed to intercommunicate the two hydraulic circuits.

When the pressure in the one hydraulic circuit is higher than that in the other hydraulic circuit, the valving element is forcibly pressed against the valve seat so that the intercommunication between the two hydraulic circuits is interrupted. But when the valving element is provided with an orifice which permits the intercommunication between the two hydraulic circuits, a small quantity of operating fluid flows from the one hydraulic circuit only through the orifice into the other hydraulic circuit.

When the separate plate is interposed together with the gasket as a valve seat between the pair of valve bodies and the separate plate is formed with an opening which is covered with the valving element, the peripheral portion of the opening of the separate plate serves as a valve seat. When the opening is covered and uncovered by the valving element, the intercommunication between the two hydraulic circuits is interrupted and established.

According to the present invention, the one-way valve and the gasket are fabricated as a unitary construction so that the following advantages and effects can be attained.

Firstly, it becomes not necessary to fabricate the one-way valve as a component part separate from the gasket so that the numbers of component parts and assembly steps can be decreased and therefore the fabrication cost can be also decreased.

Secondly, when the gasket is interposed between a plurality of valve bodies which constitute the hydraulic circuit, only by locating the gasket at a predetermined position with respect to the valve bodies, the one-way valve can be automatically and correctly located at a predetermined position at the same time so that the assembly efficiency can be enhanced.

Thirdly, since the valving element of the one-way valve and the gasket are fabricated as a unitary construction, the deviation of the valving element can be prevented so that stable and reliable sealability can be ensured.

Fourthly, assembly errors due to various specifications can be eliminated so that the valving element can be correctly located at a predetermined position so that a control step can be eliminated and therefore high productivity can be ensured.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The present invention will become more apparent from the following description of preferred embodiments thereof taken in conjunction with the accompanying drawings.

First Embodiment, FIGS. 1-5

Figure 5:
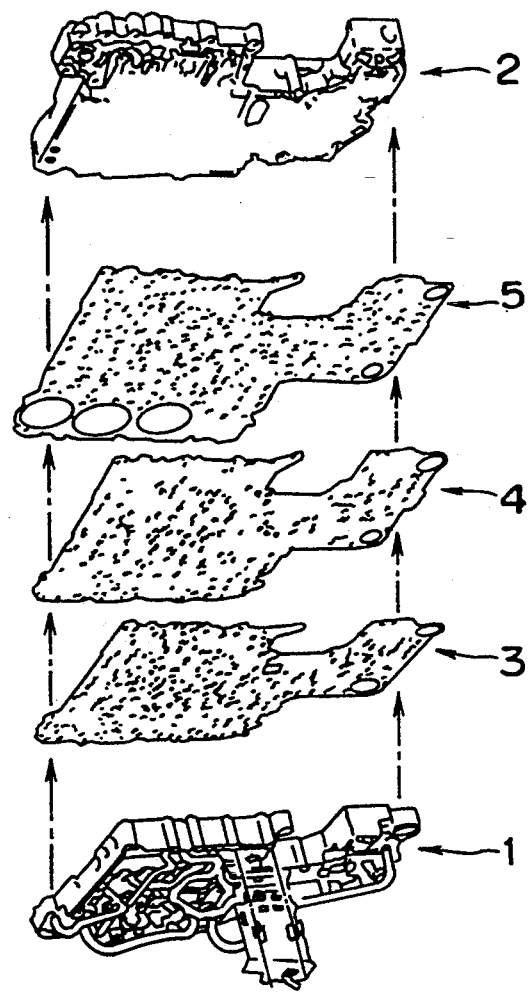
FIG. 5 is an exploded perspective view illustrating component parts of valve bodies, which constitutes hydraulic circuits of an automatic transmission, in accordance with the present invent ion.

Referring first to FIG. 5 illustrating an exploded perspective view of valve bodies which constitutes hydraulic circuits of a hydraulic control unit of an automatic transmission, reference numeral 1 denotes a lower valve body; and 2, an upper valve body. In order to ensure perfect airtightness, a lower separate gasket (to be referred to as "a lower gasket") 3, a separate plate 4 and a upper separate gasket (to be referred to as "an upper gasket") 5 are laminated in the order named between the lower and upper valve bodies 1 and 2.

Figure 1:
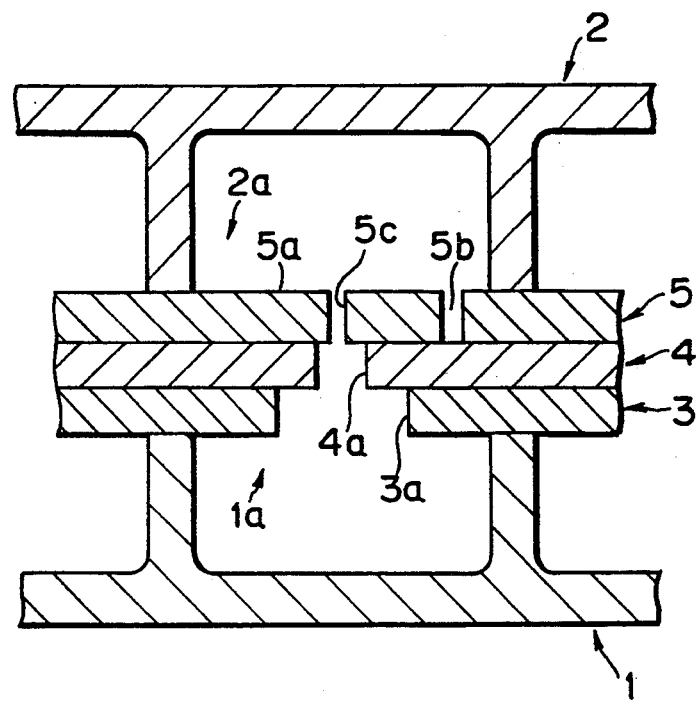
FIG. 1 is a sectional view on an enlarged scale of a one-way valve with a gasket in accordance with a first embodiment of the present invention.

Next referring to FIG. 1 illustrating a portion of a one-way valve in section on an enlarged scale, the lower and upper valve bodies 1 and 2 are formed with hydraulic circuits 1a and 2a, respectively, in order to supply hydraulic oil to frictional engaging elements (not shown) of the automatic transmission. The lower and upper valve bodies 1 and 2 are securely joined together with bolts and nuts (not shown) with the gaskets 3 and 5 and the separate plate 4 inter posed therebetween in order ensure the complete airtightness of the hydraulic circuits 1a and 2a.

In the first embodiment, the function of the hydraulic circuits 1a and 2a is to supply and discharge operating fluid to and out of a clutch which is one of the frictional engaging elements of the automatic transmission. The hydraulic circuit 1a is communicated with the clutch while the hydraulic circuit 2a, with an oil pump (not shown).

The lower gasket 3 and the separate plate 4 have coaxial oil passages 3a and 4a which are communicated with the hydraulic circuits 1a and 2a, respectively.

Figure 2:
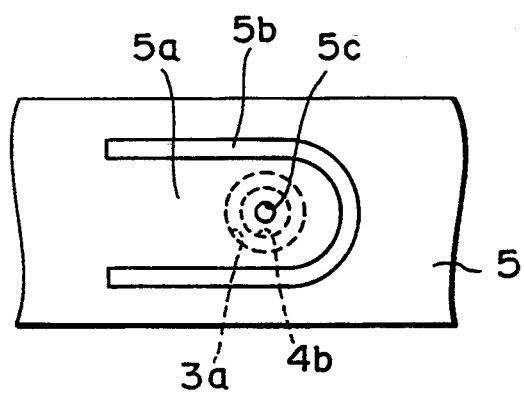
FIG. 2 is a top view of thereof illustrating an upper separate gasket.

Furthermore, a reed part 5a which is a valving element is formed in such a way that it faces the hydraulic circuits 1a and 2aand the oil passages 3a and 4a. As best shown in FIG. 2, a U-shaped slit 5b is formed at the upper surface of the upper gasket 5 radially outwardly of the oil passages 3a and 4a in such a way that the reed part 5a can elastically deform in the direction of the hydraulic circuit 2a, but is prevented by the separate plate 4 from deforming in the direction of the hydraulic circuit 1a (See FIG. 1). Therefore, the reed part 5a functions as a valving element and the peripheral portion of the oil passage 4a defined through the separate plate 4 functions as a valve seat of the one-way vale in accordance with the present invention. The reed part 5a is formed with an orifice 5c whose diameter is smaller than that of the oil passage 4a and which is substantially coaxial with the oil passages 3a and 4a.

Next the mode of operation will be described.

When the valve bodies 1 and 2 are joined together, the gaskets 3 and 5 which sandwich the separate plate 4 are interposed between the valve bodies 1 and 2. In this case, the gaskets 3 and 5 and the separate plate 4 are so positioned with respect to the valve bodies 1 and 2 that the oil passages 3a and 4a and the reed part 5a are suitably positioned with respect to the hydraulic circuits 1a and 2a as shown in FIG. 1. In other words, the oil passages 3a and 4a are in coaxial relationship and the reed part 5a completely closes the oil passage 4a. As described above, according to the first embodiment of the present invention, when the valve bodies 1 and 2 are joined together, the reed part 5a can be correctly located at its predetermined position by locating the gaskets 3 and 5 and the separate plate 4 at their positions, respectively.

Figure 3:
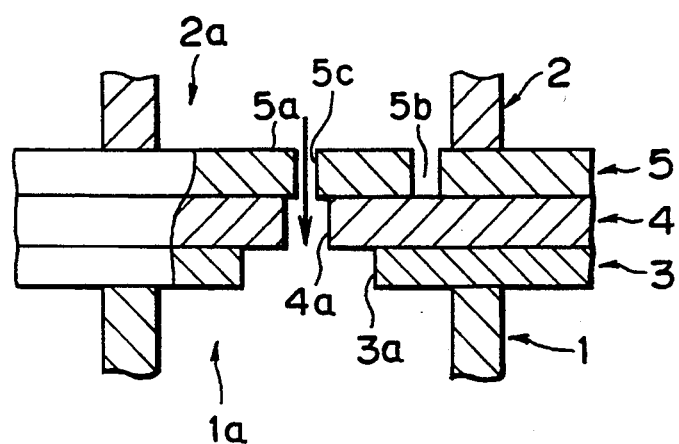
FIG. 3 is a sectional view illustrating the one-way valve when hydraulic oil is supplied to a clutch.

When the clutch is engaged, as shown in FIG. 3, hydraulic oil is supplied from the hydraulic circuit 2a through the one-way valve to the hydraulic circuit 1a. In this case, the reed part 5a is forced to close the oil passage 4a as shown in FIG. 3 so that hydraulic oil is gradually supplied only through the orifice 5c and the hydraulic circuit 1a to the clutch. As a result, the clutch gradually engage so that the shift shock which occurs when the clutch engage can be minimized.

Figure 4:
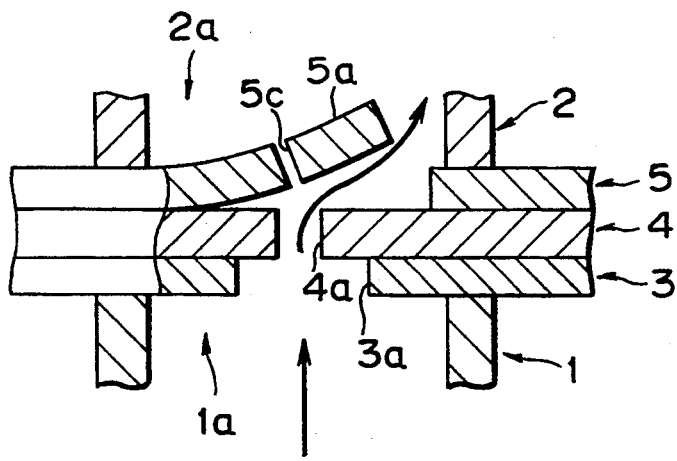
FIG. 4 is a view similar to FIG. 3, but illustrating when hydraulic oil is discharged from the clutch.

When the clutch is disengaged, as shown in FIG. 4, hydraulic oil is not supplied from the oil pump to the hydraulic circuit 2a, which in turn is communicated with a drain port (not shown). As a result, the pressure in the hydraulic circuit 1a becomes higher so that the reed part 5a is forced to deflect in the direction of the hydraulic circuit 2a and is elastically deformed to open the oil passage 4a is opened. Consequently, the pressure in the hydraulic circuit 1a rapidly falls so that hydraulic oil is discharged out of the clutch, whereby the clutch is disengaged.

As described above, according to the first embodiment of the present invention, the function of the one-way valve can be effected by the reed part 5a formed integral with the upper gasket 5 so that, opposed to the prior art, it is not necessary to fabricate a one-way valve separately from a gasket and therefore not only the number of component parts but also the number of assembly steps can be minimized, whereby the cost can be decreased. Furthermore, the reed part 5a can be correctly located at a predetermined position only by locating the gaskets 3 and 5 and the separate plate 4 are located at their predetermined positions, respectively, according to the conventional manner. The deviation of the reed part 5a from its correct position can be substantially eliminated. In addition, there is no fear that mistakes occurs when the one-way valve is assembled due to the difference in specification so that the number of control steps also can be minimized.

Furthermore, the reed part 5a and the upper gasket 5 are in unitary construction so that the deviation of the position of the reed part 5a with respect to the valve bodies 1 and 2, the lower gasket 3 and the separate plate 4 can be eliminated, whereby variations in sealability caused by the deviation of the position of the reed part 5a can be prevented and the stable performance can be ensured.

Figure 6:
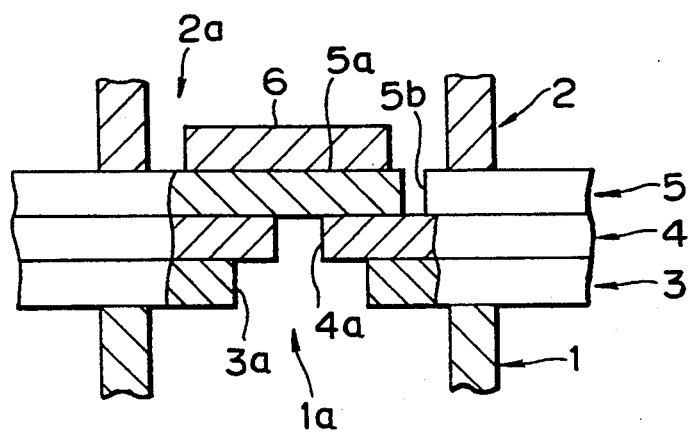
FIG. 6 is a partial sectional view on an enlarged scale of a one-way valve with a gasket of a second embodiment of the present invention.

Second Embodiment, FIG. 6

The second embodiment of the present invention is substantially similar in construction and mode of operation to the first embodiment so that only the differences from the first embodiment will be described.

In the second embodiment, the orifice 5c at the reed part 5a of the one-way valve of the first embodiment is eliminated while a reinforced member 6 which is fabricated in the form of a thin plate from a resin is bonded over the upper surface of the reed part 5a.

Since the reinforced member 6 is bonded to the reed part 5a as described above, not only spring characteristics such as the spring constant but also strength of the reed part 5a change so that the opening-closing characteristics of the reed part 5a due to the difference in pressure between the hydraulic circuits 1a and 2a also change and also the fluid discharge characteristic changes and the durability of the reed part 5a against the elastic deformations of the reed part 5a can be enhanced.

As a result, the spring characteristics and strength of the reed part 5a can be suitably selected by suitably selecting the strength of the reinforced member 6. Thus, desired durability can be attained.

So far only the first and second embodiments of the present invention have been described in detail in conjunction with the accompanying drawing, but it is to be understood that the present invention is not limited to the first and second embodiments only and that various modifications can be effected without departing from the true spirit of the present invention.

For instance, in the second embodiment, it has been described that the spring characteristics and strength of the reed part 5a can be varied by the characteristics of the reinforced member 6 bonded to the reed part 5a, but the desired characteristics of the reed part 5a can be also attained by changing the size thereof and the configuration of the slit 5b. For example, when the width of the reed part 5a is gradually increased in the direction of the root of the read part 5a (the left side in FIG. 2), rigidity of the reed part 5a can be increased.

In the first and second embodiments, it has been described that the separate plate 4 having the oil passage 4a is used as a valve seat. But the same effects and advantages of the first and second embodiments can be attained by joining with any suitable means such as adhesives a valve seat which has a relatively high degree of rigidity and is substantially similar in configuration to the slit 5b to the surface on the side of the hydraulic circuit 1a of the gasket 5 in such a way that the valve seat covers the groove 5b and becomes integral with the gasket 5. In this case, not only the separate plate 4 but also the gasket 3 on the side of the hydraulic circuit 1a can be eliminated so that the number of component parts can be minimized.

The present invention has been described in detail with respect to preferred embodiments, and it will now be that changes and modifications may be made without departing from the invention in its broader aspects, and it is the intention, therefore, in the appended claims to cover all such changes and modifications as fall within the true spirit of the invention.

What is claimed is:

1. A gasket of the type which is interposed between a pair of valve bodies each of which is formed with a hydraulic circuit for feeding operating fluid to frictional engaging elements of an automatic transmission and which are mated and joined to each other, wherein said gasket, which is interposed between said pair of valve bodies, comprises a slit which permits the intercommunication of said hydraulic circuits of said pair of valve bodies and a valving element which is defined in said gasket by said slit and is elastically deformable, said valving element including an orifice which also permits the intercommunication of said hydraulic circuits;

said gasket on the side of said hydraulic circuit of one of said pair of valve bodies further comprising a valve seat which overlaps said slit, thereby closing said slit; and depending upon the difference in pressure between said hydraulic circuits of said pair of valve bodies, said valving element is elastically deformable so that the flow of said operating fluid is permitted to flow from one of said hydraulic circuit to said other hydraulic circuit.

2. A gasket as claimed in claim 1 wherein said operating fluid is an hydraulic oil.

3. A gasket as claimed in claim 1 wherein said valve seat includes a separate plate which is interposed, together with said gasket, between said pair of valve bodies; and said separate plate which is interposed between said pair of valve bodies includes an opening upon which said valving element overlies.

4. A gasket as claimed in claim 3 wherein the portion of said gasket which overlies said opening includes a U-shaped slit, whereby said valving element is defined.

* * * * *